UNITED STATES PATENT OFFICE.

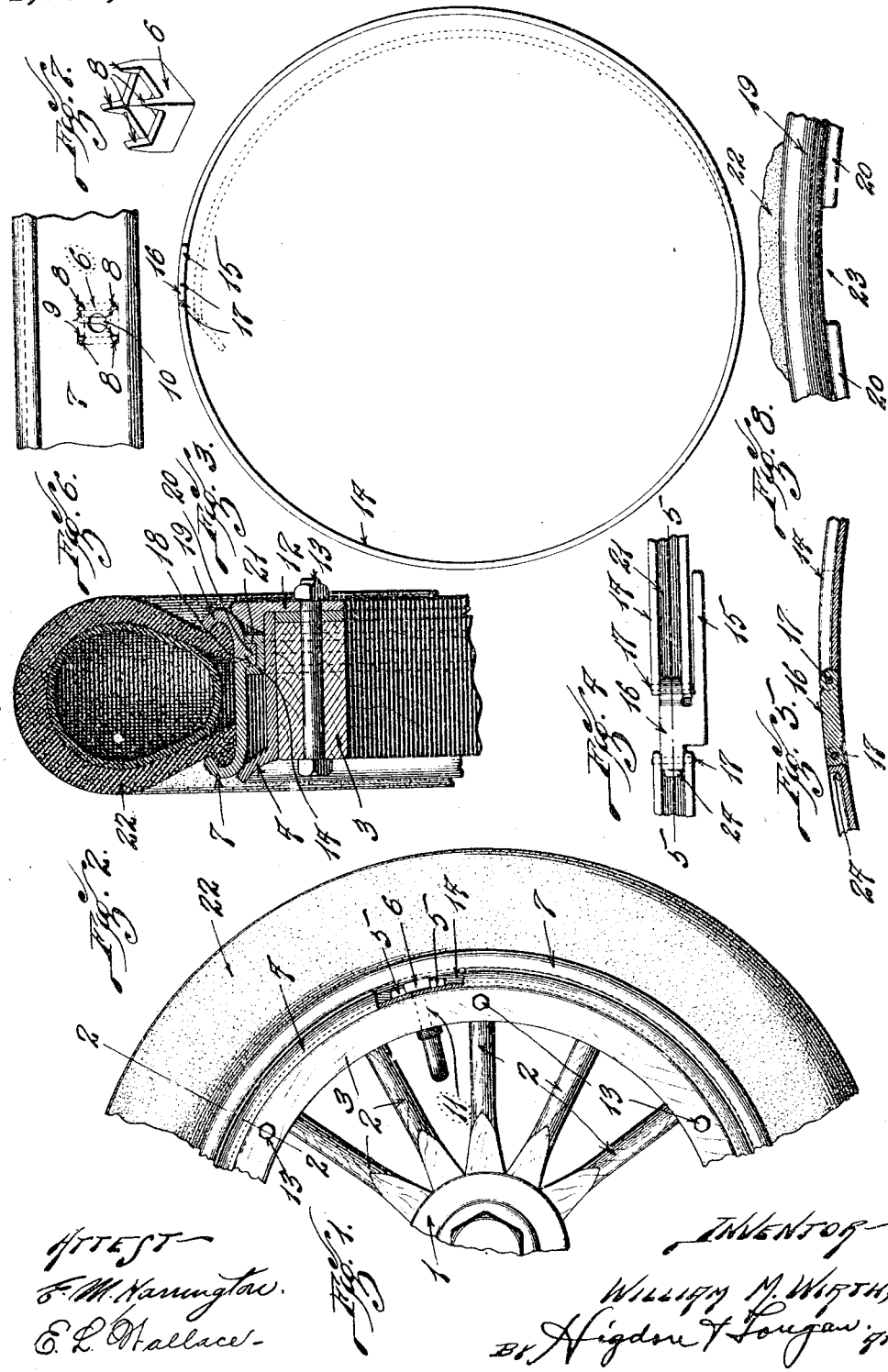

WILLIAM M. WIRTH, OF ST. LOUIS, MISSOURI.

SEPARABLE RIM FOR AUTOMOBILE-WHEELS.

1,094,509.

Specification of Letters Patent. Patented Apr. 28, 1914.

Application filed February 27, 1913. Serial No. 751,654.

*To all whom it may concern:*

Be it known that I, WILLIAM M. WIRTH, a citizen of the United States, and resident of St. Louis, Missouri, have invented certain new and useful Improvements in Separable Rims for Automobile-Wheels, of which the following is a specification containing a full, clear, and exact description, reference being had to the accompanying drawings, forming a part hereof.

My invention relates to an improved separable rim for automobile wheels, and consists in the novel construction hereinafter described and particularly designated in the appended claims.

The object of my invention is to provide an improved separable rim for automobile wheels, whereby the operation of applying and detaching a tire may be performed in the least possible time.

A further object of my invention is to provide an improved separable rim for automobile wheels which will be very strong, efficient and durable.

In the drawings: Figure 1 is a side elevation of a portion of an automobile wheel and tire having my invention applied thereto; Fig. 2 is a sectional end elevation, the section being taken on the line 2—2 of Fig. 1;
Fig. 3 is a side elevation of my improved expansible locking ring; Fig. 4 is a detail plan view of a portion of said expansible locking ring, showing the expanding lever; Fig. 5 is a sectional side elevation of the same, the section being taken on the line 5—5 of Fig. 4; Fig. 6 is a plan view of a portion of the separable clencher-rim; Fig. 7 is a perspective view of an anti-creeping lug; and Fig. 8 is a side elevation of a portion of the clencher-rim.

The numerals 1, 2 and 3 indicate respectively the hub, spokes and felly of a common automobile wheel, on which is secured in the usual way a fixed section 4 of the base-rim.
Said section 4 is provided on its outer periphery with a pair of radial lugs 5 which are spaced apart to receive between them an anti-creeping lug 6 which, in the present instance, is made separate from, but secured to the inner periphery of the clencher-rim section 7. Said lug 6 is provided on each of its four corners with malleable ears 8 which are used for the purpose of securing said lug 6 in position upon said section 7, said ears 8 being passed through apertures 9 formed in said section 7. Said ears 8 are clenched on the outer surface of said section 7. (See Fig. 6.) The said anti-creeping lug 6 is provided with a central aperture 10 through which the valve-stem 11 projects.

The numeral 12 indicates the detachable plate of the base-rim, the same being secured in position by the usual bolts 13 passed through said plate and felly.

The numeral 14 indicates the split expansible locking-ring which is U-shaped in cross section and has its ends pivotally connected by an expanding-lever 15. The lever 15 is composed of a lever proper and an expanding-body 16, both of which are curved to the radius of the said split-ring upon its outer and inner periphery, and said curved expanding body is pivoted at its opposite ends to the opposite ends of the said split ring 14 by means of bolts or rivets 17, so that when said lever is thrown to the position indicated by dotted lines in Fig. 3, the said ring 14 will be contracted. This construction of the split-ring and the curved expanding body 16 and its curved lever 13 is such that when the parts are in a locked position as shown in Fig. 3, the said parts will present a complete symmetrical ring entirely devoid of peripheral projections. The principal advantage of this construction is in the fact that there are no peripheral projections to interfere with the other parts of the mechanism.

The section 7 of the clencher-rim is provided upon its inner edge with an inwardly-projecting flange 18 and the opposite section 19 of said clencher-rim is also provided with a mating inwardly-projecting flange 20, which flange 20 together with the flange 18 of the section 7 forms a rectangular body which fits into the peripheral groove 21 of said expansible-ring 14, so that the latter when expanded as shown in Fig. 3 will securely hold the sections 7 and 19 of the clencher-rim together. When said sections 7 and 19 are thus held together they will in turn securely hold in position the clencher tire 22. The mating flanges 18 and 20 of the clencher-rim are cut away at 23 to form curved recesses for receiving the curved expanding-lever body 16. (See Fig. 8.) The mating sides of the clencher-rim flanges 18 and 20 are inclined, as shown in Fig. 2, so that they will wedge within the peripheral-groove 21 of the said expansible-ring 14. To form a strengthening-abutment for receiving the thrust of one end of said expanding-lever body 16, I turn outwardly the metal at the base of said groove 21, forming thereat an abutment-lug 24.

I claim:

1. An improved separable rim for automobile wheels, comprising mating clencher sections having mating inturned flanges upon their inner peripheries, in combination with a split expansible ring U-shaped in cross section and having an annular groove in its outer periphery for receiving said mating flanges, and a curved expanding body having its ends pivoted to the adjacent ends of said ring and symmetrically curved to the radius of said ring upon both outer and inner peripheries, and mounted between the ends of said ring.

2. An improved separable rim for automobile wheels, comprising mating clencher sections having mating inturned flanges upon their inner peripheries, in combination with a split expansible ring U-shaped in cross section and having an annular groove in its outer periphery for receiving said mating flanges, a curved expanding body having its ends pivoted to the adjacent ends of said ring and symmetrically curved to the radius of said ring upon both outer and inner peripheries and mounted between the ends of said ring, and an operating lever also curved to the radius of said ring and fixed at one end to said curved expanding body.

3. An improved separable rim for automobile wheels, comprising mating clencher sections having mating inturned flanges upon their inner peripheries, in combination with a split expansible ring U-shaped in cross section and having an annular groove in its outer periphery for receiving said mating flanges, a curved expanding body having its ends pivoted to the adjacent ends of said ring and symmetrically curved to the radius of said ring upon both outer and inner peripheries and mounted between the ends of said ring, and an operating lever also curved to the radius of said ring and fixed at one end to said curved expanding body, portions of the said mating flanges being cut away to form a recess in which said curved expanding body is symmetrically located when the ring is expanded.

4. An improved separable rim for automobile wheels, comprising mating clencher sections having mating inturned flanges upon their inner peripheries, in combination with a split expansible ring U-shaped in cross-section and having an annular groove in its outer periphery for receiving said mating flanges, a curved expanding body having its ends pivoted to the adjacent ends of said ring and symmetrically curved to the radius of said ring upon both outer and inner peripheries and mounted between the ends of said ring, and an operating lever also curved to the radius of said ring and fixed at one end to said curved expanding body, portions of the said mating flanges being cut away to form a recess in which said curved expanding body is symmetrically located when the ring is expanded, and a strengthening abutment formed in said groove for receiving the thrust thereat of one end of said expanding-body.

In testimony whereof, I have signed my name to this specification, in presence of two subscribing witnesses.

WILLIAM M. WIRTH.

Witnesses:
E. L. WALLACE,
JOHN C. HIGDON.